United States Patent [19]
Erdman et al.

[11] Patent Number: 5,661,353
[45] Date of Patent: Aug. 26, 1997

[54] ELECTROSTATIC SHIELD FOR AC MOTOR

[75] Inventors: Jay M. Erdman, Cedarburg; Russel J. Kerkman, Milwaukee; David W. Schlegel, Saukville; Gary L. Skibinski, Milwaukee, all of Wis.

[73] Assignee: Allen-Bradley Company, Inc., Milwaukee, Wis.

[21] Appl. No.: 449,977

[22] Filed: May 25, 1995

[51] Int. Cl.⁶ .................... H02K 5/10; H02K 5/12
[52] U.S. Cl. ............... 310/86; 310/85; 310/214; 310/215; 310/219; 310/220
[58] Field of Search ................ 310/86, 85, 214, 310/215, 219, 220

[56] References Cited

U.S. PATENT DOCUMENTS

| | | | |
|---|---|---|---|
| 3,283,187 | 11/1966 | Schaefer | 310/86 |
| 3,334,252 | 8/1967 | Gayral | 310/214 |
| 3,517,231 | 6/1970 | Massar | 310/52 |
| 3,560,776 | 2/1971 | Kildeshev | 310/214 |
| 4,321,498 | 3/1982 | Vogt | 310/215 |
| 4,539,499 | 9/1985 | Punch et al. | 310/214 |
| 4,583,014 | 4/1986 | Murphy, Sr. et al. | 310/52 |
| 4,877,985 | 10/1989 | Byrd et al. | 310/86 |
| 4,908,347 | 3/1990 | Denk | 505/1 |
| 4,949,001 | 8/1990 | Campbell | 310/220 |
| 5,097,163 | 3/1992 | Shah et al. | 310/51 |

*Primary Examiner*—Steven L. Stephan
*Assistant Examiner*—Elvin G. Enad
*Attorney, Agent, or Firm*—Michael A. Jaskolski; John M. Miller; John J. Horn

[57] ABSTRACT

An apparatus reducing capacitive coupling between the stator and the rotor of an electromagnetic machine. The apparatus includes an electrically connective shield positionable between the stator and the rotor, the shield electrically separated from both the stator windings and the rotor when so positioned. A grounder electrically connects the shielder to ground thus substantially reducing capacitive coupling between the stator and the rotor.

15 Claims, 4 Drawing Sheets

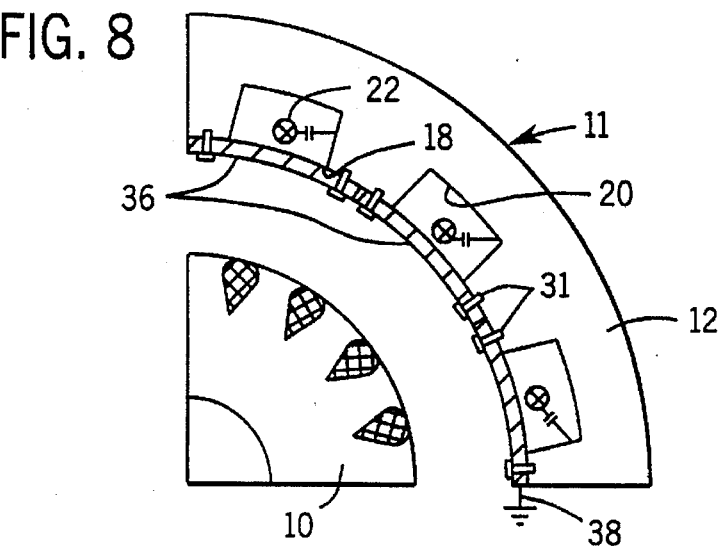
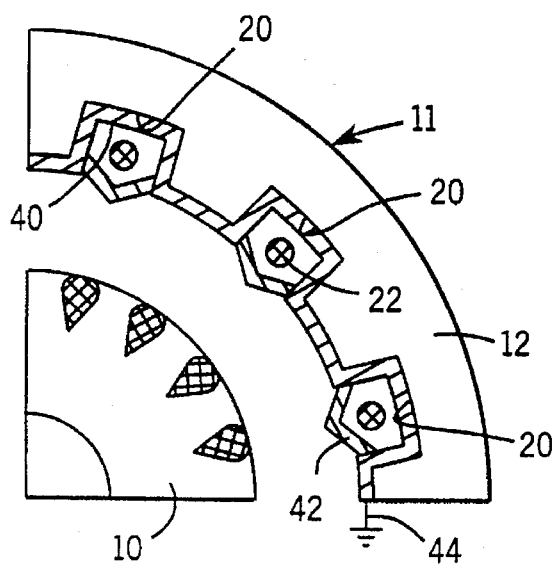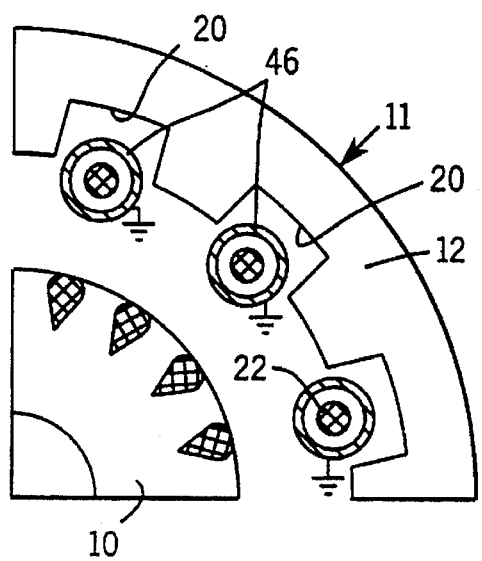

ELECTROSTATIC SHIELD FOR AC MOTOR

FIELD OF THE INVENTION

The present invention is related to AC motors and in particular to an apparatus for reducing capacitive coupling between stator and rotor windings so as to greatly reduce electrostatic discharge through rotor ball bearings.

DESCRIPTION OF THE ART

Induction motors commonly include a rotor and a stator, the rotor positioned within a cylindrical stator frame and including a plurality of rotor windings equi-spaced about an external wall. An internal surface of the stator frame forms longitudinally running winding slots which receive stator windings. In this type of motor, each stator winding is connected to an AC voltage source by a separate supply line, the source generating an alternating current therein.

As the stator currents alternate, a wave of magnetic field flux, directed radially toward the rotor, rotates around the axis of the rotor shaft. The relative motion between the stator flux wave and the rotor windings induces an alternating voltage and current in each of the rotor windings. The alternating rotor currents, in turn, produce a magnetic rotor flux directed outwardly toward the stator. Because of the interaction between the flux fields, the rotor encounters a force tending to rotate the rotor as the stator currents alternate.

To facilitate rotor rotation, the rotor is normally fitted with at least two ball bearings, each ball bearing including a plurality of metallic balls sandwiched between inner and outer rings, each ring forming a raceway that receives the balls. One ring is securely connected to the rotor while the other is securely connected to the stator free. The ball bearings transfer loads between the rotor and stator and permit relatively free rotor rotation with a minimum of friction.

To further facilitate easy rotation, each ball bearing is usually packed with a grease or oil based lubricant that forms a thin layer between the balls and the rings. In addition to proper lubrication. The raceways and ball surfaces must be accurately ground in the rings to a very fine finish (16µin or less) so as to limit the coefficient of friction therebetween.

Unfortunately, while ball bearings can be precisely manufactured and smoothly finished, during motor operation, ball bearing quality can deteriorate in the form of surface pitting and fluting until the bearing-ring coefficient of friction is altered. This, in turn, limits motor performance and eventually necessitates ball bearing replacement. Both replacement and poor performance are costly and undesirable.

Capacitive coupling between rotor and stator windings has been identified as a predominant source of ball bearing deterioration. As current flows through a stator winding, charge builds up on the surface of the winding as a surface charge density. The charge generates an electric field which is normal to the stator winding surface, and, at least in part, is directed toward the rotor. The air gap between the stator and the rotor acts as a dielectric.

As charge builds up on a stator winding, parasitic capacitive coupling is caused between the stator winding and the rotor. Where the charge on a stator windings is negative, free electrons within the rotor are repelled and forced to the inside of the rotor. This leaves a positive charge on the external wall of the rotor and a negative charge centrally located within the rotor and along a longitudinally extending rotor shaft.

The centrally located charge similarly charges the ring that is connected to the rotor. The lubricant between the rings and balls acts as another dielectric. Thus, the balls and rings form additional capacitive networks.

When subjected to a sufficiently intense field, a dielectric is prone to breakdown, the dielectric in fact becoming conductive. In dielectric breakdown, large conduction currents flow, due to the fact that many electrons are freed as a result of the force of the electric field in which the dielectric is placed. During dielectric breakdown the charge built up on either side of the dielectric rapidly flows through the dielectric causing a current in the network conductors. The field strength at which dielectric breakdown occurs depends on the dielectric characteristics and the gap size between adjacent conductors.

The air gap between the rotor and stator is generally wide enough that no breakdown occurs there. However, as the gaps between the balls and adjacent races are relatively minuscule (i.e. a thin layer of lubricant), dielectric breakdown occurs frequently at these points. Often, such breakdown generates a spark or small explosion on one of the ball surfaces due to rapid electron flow through the dielectric. When these sparks are large, they can pit and deform ball surfaces eventually adversely altering coefficients of friction. This ball deforming process is referred to as electrostatic discharge machining (EDM).

One way to eliminate EDM is to provide a shaft grounding brush to reduce charge buildup on the races and hence minimize the electrical fields directed toward the balls. The brush allows charge in the central portion of the rotor to dissipate, thus limiting charge between the rings and balls.

Unfortunately, this solution has several problems. For example, because the shaft rotates, any coupling brush grounding the shaft must allow movement. Couplers that can maintain contact through hundreds of rotations per second and do not appreciably impede rotor rotation are extremely expensive to design and manufacture. Moreover, even though such couplers have been developed, they must be routinely maintained and eventually replaced to ensure proper operation.

Another solution is to dope the bearing lubricant with conductive grit that enables ring charge to travel from one ring to the other without building up large potential therebetween. While this is an effective short term solution, it has proven ineffective in the long term as conductive grit itself undesirably modifies ball surfaces during rotor rotation.

Thus, it would be advantageous to have an inexpensive and maintenance free apparatus and/or method by which electrostatic discharge machining could be eliminated so that ball bearing life could be extended.

SUMMARY OF THE INVENTION

The present invention includes an electrostatic shield positioned between the stator windings and the rotor of a motor which eliminates parasitic capacitive coupling therebetween. The shield indirectly reduces ball bearing electrostatic discharge machining by disrupting its primary coupling, stator-rotor capacitance. The shield includes an electrically conducting cover separated from the stator windings. The cover substantially blocks the electric fields produced by charges on the surfaces of the stator windings but allows the magnetic fields produced by the alternating currents in the stator and rotor windings to pass between the stator and rotor.

Therefore, one object of the present invention is to provide an apparatus which minimizes ball bearing deterioration. The shield reduces the electric field between the stator and the rotor and thereby reduces the electric fields between the races and the balls. By disrupting the electric field between the races and the balls, dielectric breakdown therebetween can be substantially reduced thus minimizing ball deterioration.

Another object is to facilitate the above object in a cost effective manner. To this end, any electrically conducting material can be used to provide the shield and manufacturing tolerances for such a shield are relatively low. Preferably, the shield is formed of a thin copper sheet material.

Yet another object is to eliminate parasitic capacitive coupling between the rings and the balls in a manner which is maintenance free. The shield is stationary and not subject to wear. Once the shield is installed it should effectively eliminate EDM for the life of the motor without maintenance.

The foregoing and other objects and advantages of the invention will appear from the following description. In the description, reference is made to the accompanying drawings which form a part hereof, and in which there is shown by way of illustration several preferred embodiments of the invention. Such embodiments do not necessarily represent the full scope of the invention,-however, and reference is made therefore to the claims herein for interpreting the scope of the invention.

BRIEF DESCRIPTION OF THE DRAWINGS

FIG. 8 is a schematic similar to that shown in FIG. 2 incorporating a first embodiment of the present invention;

FIG. 9 is a schematic similar to that shown in FIG. 2 incorporating a second embodiment of the present invention; and FIG. 10 is a schematic similar to that shown in FIG. 2 incorporating a third embodiment of the present invention.

DETAILED DESCRIPTION OF THE PREFERRED EMBODIMENT

Figure 1:
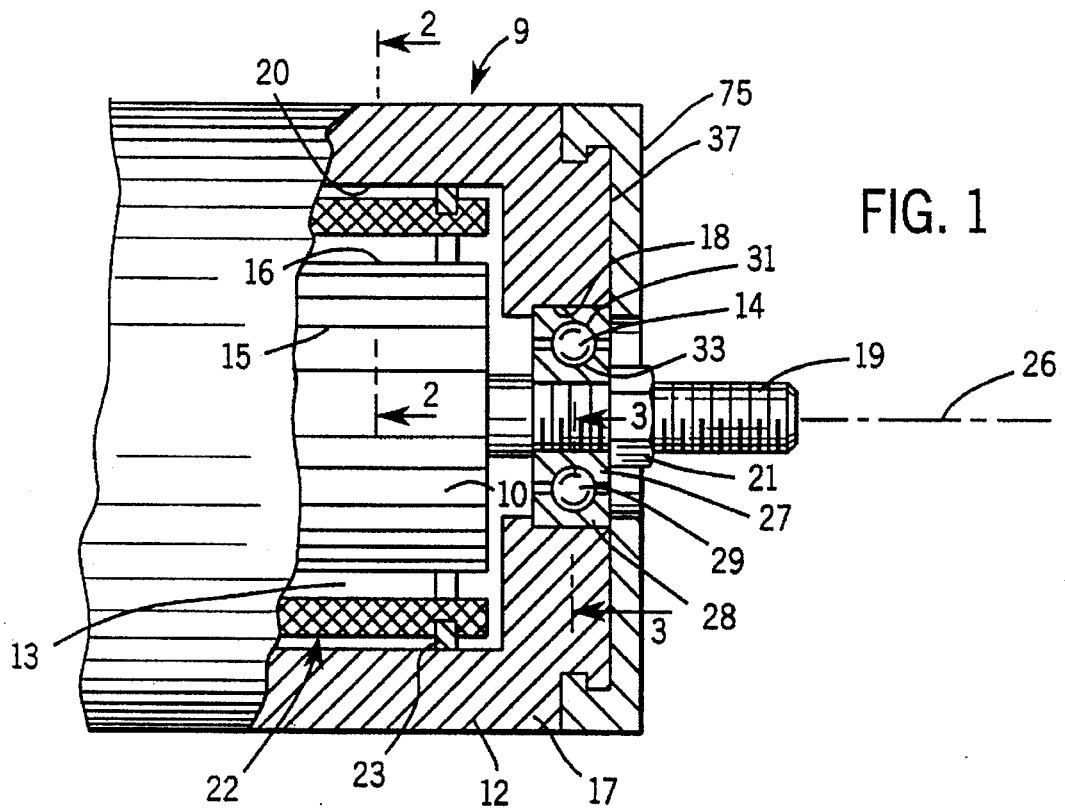
FIG. 1 is a partial cross sectional view of a portion of an induction motor.
Figure 2:
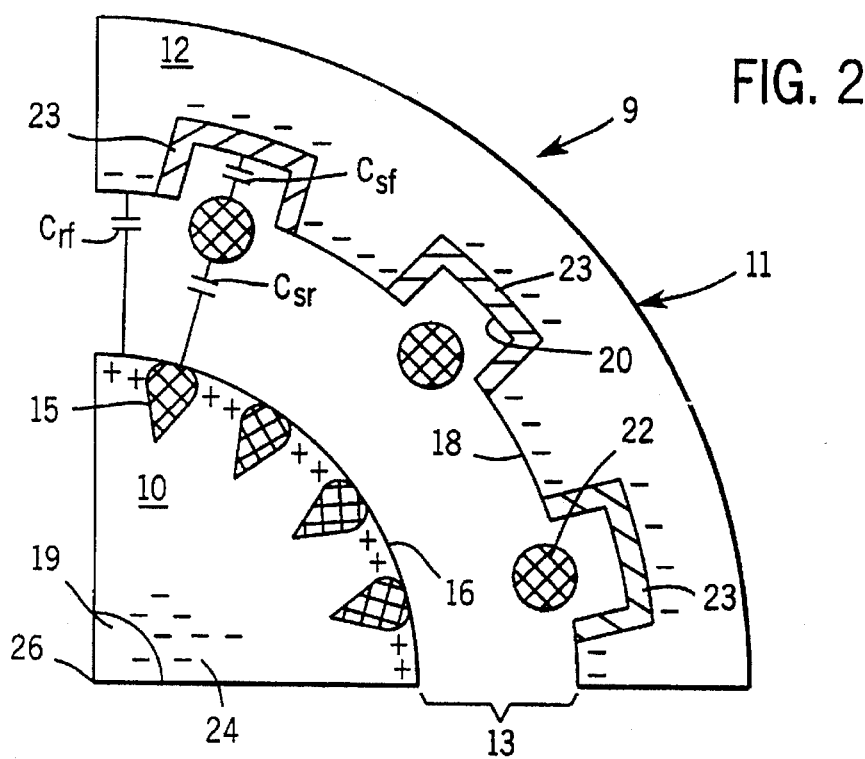
FIG. 2 is a cross-sectional view of part of the induction motor shown in FIG. 1 taken along the line 2—2.

Referring now to FIGS. 1 and 2, the present invention will be described in the context of a commonly configured induction motor 9 including a cylindrically shaped rotor 10 and a cylindrically shaped stator 11, the stator 11 being formed around the rotor 10 so as to leave an air gap 13 therebetween.

The rotor 10 includes rotor windings 15 extending from one end of the rotor to the other, each winding 15 being parallel to a central rotor axis 26. The windings are equally spaced about an external wall 16 of the rotor 10. The rotor 10 also includes a central portion 24 around axis 26. The central portion 24 of the rotor 10 includes a shaft having a first shaft end 19 extending longitudinally along axis 26. The opposite end of the shaft (not shown), extends longitudinally from the central portion 24 in the opposite direction as end 19, and is used to support the rotor with a bearing similar to the one described herein.

The stator 11 forms an internal surface 18 including a plurality of slots 20 equi-space around the internal surface 18. The stator 11 also includes a plurality of stator windings 22, one stator winding 22 is shown inside each slot 20. The windings 22 are spaced from the frame 12 by insulators 23 which electrically insulate each winding 22 from other windings in the same slot and from the frame 12.

Figure 3:
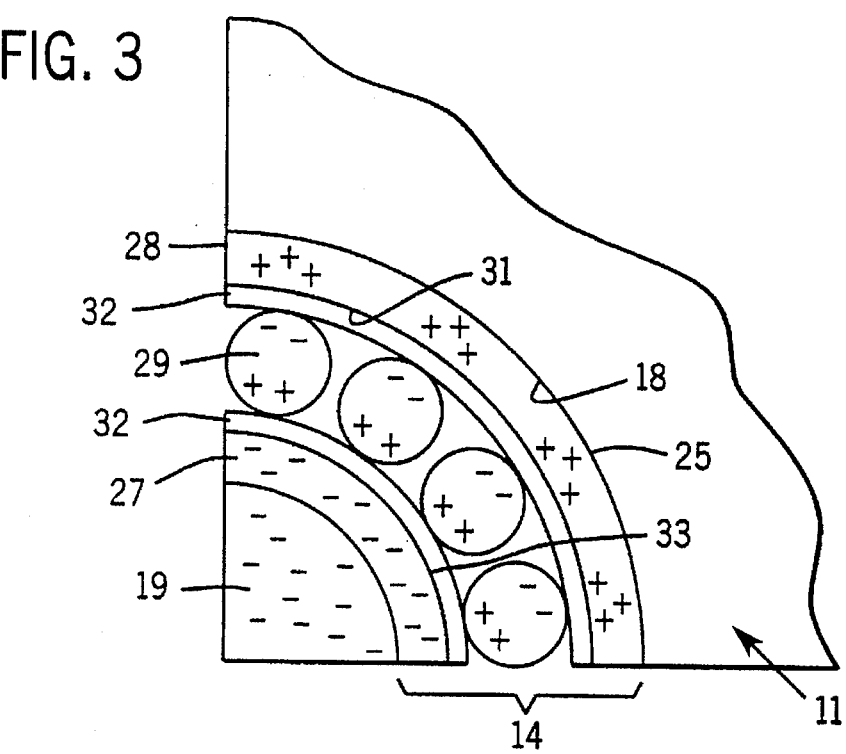
FIG. 3 is a cross-sectional view of part of the induction motor shown in FIG. 1 taken along the line 3—3.

Referring to FIGS. 1 and 3, the motor 9 also includes two annular ball bearings 14, one ball bearing positioned at a drive end 17 of the rotor 10 and the other ball bearing 14 positioned at the opposite end (not shown). Because both ends of the rotor are similarly mounted, only one end, the drive end 17 shown in FIG. 1, will be described here in detail, any subtle differences being noted. Each ball bearing 14 includes an internal ring 27, an external ring 28, and a plurality of balls 29 sandwiched therebetween. Each ring 27, 28 forms a raceway 31, 33 that receives the balls 29. In addition, each ball bearing 14 is packed with either an oil or grease based lubricant which provides a slippery lubricant layer 32 between each of the balls 29 and adjacent raceways, 31, 33.

The internal ring 27 is secured to the shaft 19 so that the ring 27 and shaft 19 rotating together. In FIG. 1, the internal ring 27 is sandwiched between a shaft shoulder 25 and a locknut 21, the nut 21 pressing the ring 27 against the shoulder 25.

The external ring 28 should fit snugly within the area defined by the internal wall 18 of a bearing bracket 75. Ring 28 is held stationary relative to the bearing bracket 75 at all times. In FIG. 1, the external ring 28 is secured using the bearing bracket 75, that forces the ring 28 against a frame shoulder 37.

With the internal and external rings 27, 28 secured to the shaft and internal surface 19, 18 respectively, the rotor 10 is centrally located within the stator frame 12 for rotation about axis 26.

The stator windings 22 are connected to separate AC supply lines to provide alternating currents. The alternating currents form a magnetic flux field which rotates around the internal surface 18 of the stator 11 and induces a rotor magnetic flux field in the rotor windings 15. The rotor magnetic flux field is attracted to the stator winding magnetic flux field and thus, the rotor 10 experiences a rotating force tending to rotate the rotor 10 about the rotation access 26.

In addition to creating a desired magnetic field, the alternating currents in the stator windings 22 also generate electrical charge which builds up on the windings 22. The charge buildup in turn creates electric fields which are normal to the surfaces of the stator windings 22, emanating in all directions around each windings 22. Referring to FIG. 2, the air gap 13 between the stator windings 22 and the rotor 10 acts as a dielectric. Similarly, the air gap between the stator windings 22 and the frame 12 acts as a dielectric. Moreover, the air gap between the frame 12 and rotor 10 also acts as a dielectric.

The electric fields result in parasitic capacitive $C_{sr}$ coupling between each stator winding 22 and an adjacent portion of the rotor 10. In addition, because the stator windings 22 are separated from the frame 12 by insulators 23, another parasitic capacitance $C_{sf}$ is generated between each stator winding 22 and the frame 12. Moreover, because charge accumulates on the stator 12 and rotor 10, a third parasitic capacitance $C_{rf}$ is generated between the frame 12 and rotor 10.

Referring again to FIG. 2, where the charge on the stator windings 22 is negative, the charge repels free electrons within surrounding conductors. Electrons within the rotor 10 are forced to the central portion 24 of the rotor 10. This leaves a positive charge on the external wall 16 of the rotor 10 and a negatively charged central portion 24. The negative charge in the central portion 24 causes the shaft 19 to be negatively charged. The potential difference between the shaft and ground is referred to herein as rotor voltage $V_r$.

Referring to FIG. 3, the internal ring 27, being electrically conductive and in contact with the shaft 19, assumes the same charge as the shaft 19. The lubricant 32 forms a dielectric between the balls 29 and the rings 28, 27. With high quality ball bearings, during 20% of the operating time there is low resistance metal-to-metal contact between the balls 29 and the rings 27, 28. This contact allows capacitive voltage buildup between the balls 29 and the rings 27, 28 to discharge. However, during the other 80% of operating time, when the lubricant acts as a dielectric, the bearings 14 appear to be highly resistive impedances allowing charge to build up between the balls 29 and the rings 27, 28 and between the rings 27, 28 themselves. Thus, capacitive coupling exists between the balls 29 and rings 27, 28.

Figure 4:
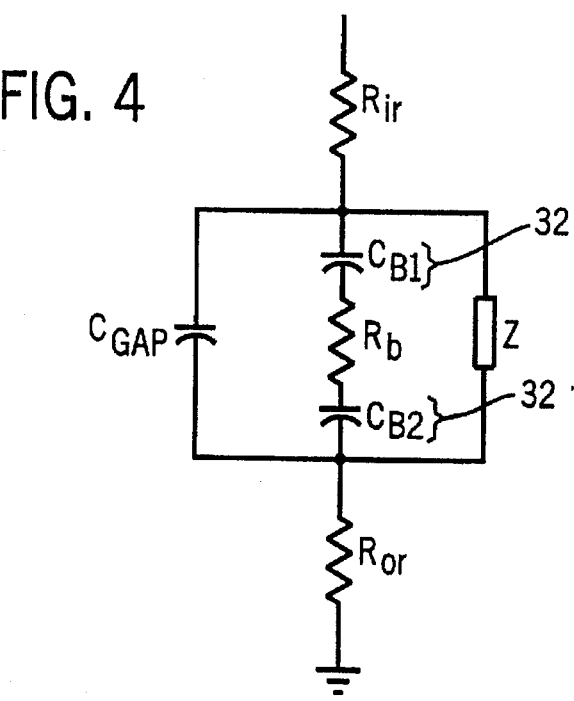
FIG. 4 is an equivalent circuit of the ball bearing shown in FIG. 3.

Referring also to FIG. 4, an equivalent circuit representing the bearing Junction can be observed. In the equivalent circuit, each ring 27, 28 is characterized by a resistance $R_{ir}$, $R_{or}$ respectively. Because a gap exists between the inner and outer rings 27, 28, a gap capitance $C_{GAP}$ is generated as charge builds up on facing ring surfaces. Each ball 29 is also characterized by a resistance $R_b$ located in the equivalent circuit between the race resistances $R_{ir}$, $R_{or}$. Between the ball resistance $R_b$ and the race resistances $R_{ir}$, $R_{or}$ additional capacitances $C_{B1}$, $C_{B2}$ respectively, are generated due to charge build up on th Finally, the equivalent circuit also includes a non-linear impedance $Z_1$ between the rings which accounts for mechanical and electrical abnormalities and randomness of the bearings.

When the electric field between a ring and a ball 29 exceeds a maximum field intensity, the lubricant 32 breaks down. Upon dielectric breakdown charge on a ring 27 or 28 equalizes with the balls 29, electrons rapidly moving therebetween. This electron movement is referred to herein as rotor current $I_r$ and often, when large enough, results in a small sparking explosion on the surface of the ball 29. This type of explosion results in pitting and fluting of the ball and race surface which causes increased friction during rotation.

Figure 5:
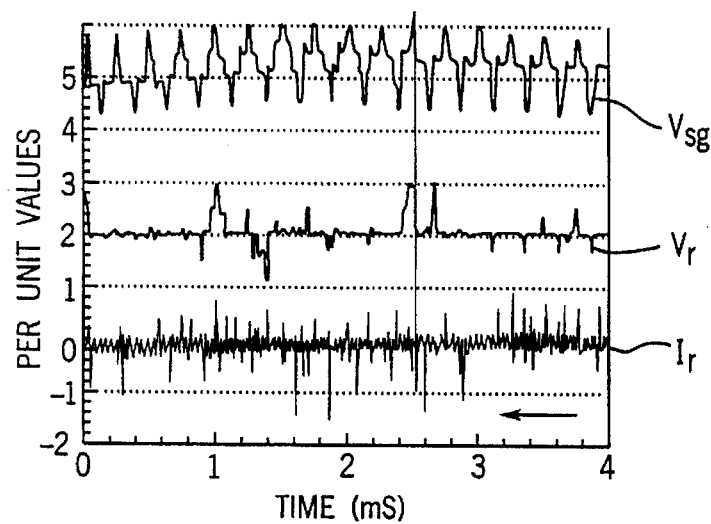
FIG. 5 is a graph illustrating stator neutral to ground voltage, rotor voltage and rotor current values of a motor without a shield.

Referring now to FIG. 5, three wave forms generated for a motor without the shield of the present invention can be observed. A stator neutral to ground voltage $V_{sg}$ displays a typical cycle waveform associated with a PWM voltage source invertor. The wave form is cyclical having generally positive half waves followed by generally negative half waves. A rotor voltage $V_r$ and rotor current $I_r$ are also shown.

Figure 6:
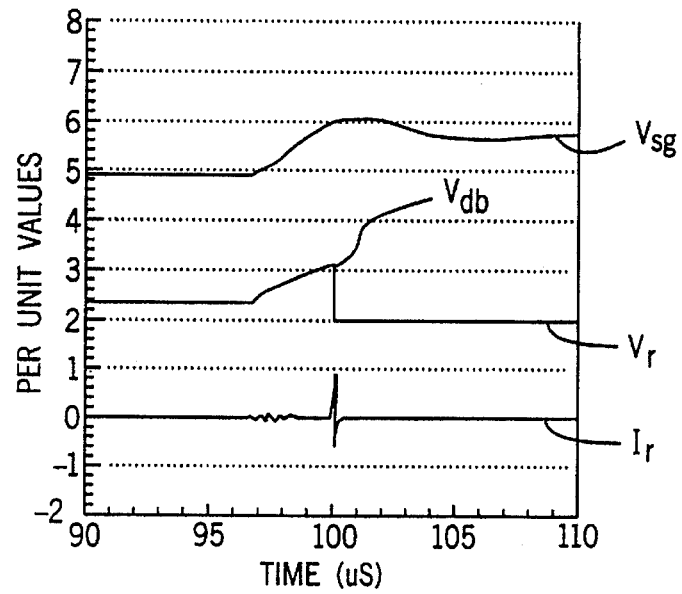
FIG. 6 is a graph similar to FIG. 5 in expanded form.

The rotor voltage $V_r$ is grounded for a majority of the time but occasionally tracks the stator neutral to ground voltage $V_{sg}$. Referring also to FIG. 6, an expanded plot of the wave forms shown in FIG. 5 can be observed. As the stator neutral to ground voltage $V_{sg}$ increases, assuming no metal-to-metal ball and ring contact, the rotor voltage $V_r$ responds with a capacitive charging characteristic. During capacitive charging, rotor current $I_r$ is nonexistent as the bearing 14 operates as a highly resistive impedance.

Referring also to FIG. 3, at some point, however, once the rotor voltage $V_r$ reaches a critical dielectric breakdown voltage $V_{db}$, the dielectric breaks down and allows charge accumulated on the shaft 19 to pass from the internal ring 27 to a ball 29 and on to the external ring 28. At this instant, the rotor current $I_r$ pulses and the rotor voltage potential $V_r$ goes to zero. It is this discharge, or current pulse, that produces sparks and advances ball bearings wear.

Referring again to FIGS. 3 and 5, most of the time the rotor voltage $V_r$ does not track the stator neutral to ground voltage $V_{sg}$. This is because charge between the rings 27, 28 and balls 29 equalize when the balls 29 make metal-to-metal contact with the rings 27, 28. At these times rotor voltage potential $V_r$ is shorted across the bearing. While metal-to-metal contact only occurs during approximately 20% of operating time with high bearings, this is often enough that the voltage potential $V_r$ is frequently zeroed (i.e. the Z in FIG. 4 assuming a zero value). The present invention is concerned with the instances when shorting does not take place prior to the rotor voltage $V_r$ reaching the breakdown voltage $V_{db}$.

The present invention eliminates ball bearing wear by reducing parasitic capacitive coupling between the stator 11 and rotor 10 which in turn limits rotor voltage $V_r$ and hence reduces rotor currents $I_r$ that pass through the bearings.

Referring to FIG. 8, in a first embodiment of the present invention, a plurality of shield members 36 are provided on the internal surface 18 of the stator 11. Each shield 36 extends over one of the slots 20. Adjacent shield members 36 either contact each other or slightly overlap and extend the entire length of the stator 11 in order to completely separate the rotor 10 and the stator 11.

While any fastening means can be used to connect the shield members 36 to the frame 12, preferably each shield member 36 is connected to the frame 12 by a plurality of steel screws 31 extending into holes in surface 18. Where the shield is relatively thin, another preferred method of attachment is by placing an adhesive on the back of the shield capable of sticking to the internal frame surface 18. A ground 38 is directly attached to the shield members 36.

With the shield members 36 in place, capacitive coupling between the stator windings 22 and adjacent shield members 36 generates charge on the shield members 36, not the rotor 10. Because the shield members 36 are grounded, instead of becoming polarized by the induced charge, the induced charge in the shield members 36 is dissipated through ground 38. Little, if any, electric field is directed toward the rotor 10. While capacitance still exists between the stator windings 22 and frame 12, the shield members 36 make electrical contact with the frame 12 and any charge induced in the frame 12 is dissipated through the shield members 36 to ground 38.

Where the frame 12 is highly conductive, the width of the shielding members 36 can be limited to a size that roughly covers an associated slot 20. In this case, so long as each of the shielding members 36 is grounded, any induced charge in the frame 12 exits the frame through the grounding members. Alternatively, assuming each shield 36 makes electrical contact with the frame 12, by grounding the frame 12, each shield would likewise be grounded.

Figure 7:
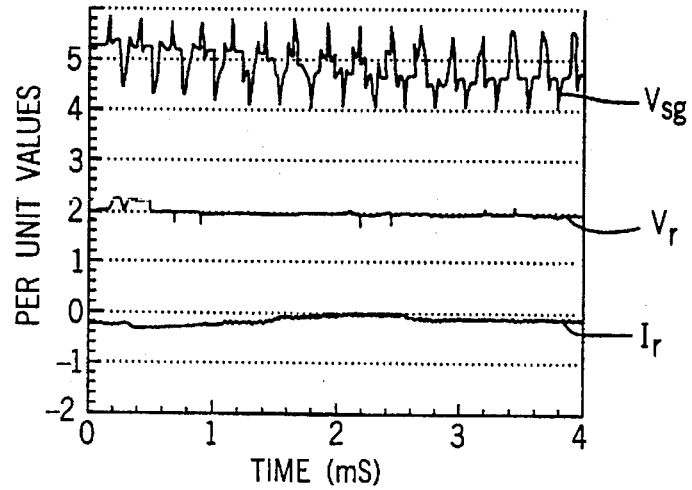
FIG. 7 is a graph similar to that shown in FIG. 5 for a motor including a shield according to the present invention.

Referring now to FIG. 7, a graph similar to that shown in FIG. 5 can be observed wherein wave forms representing stator neutral to ground voltage $V_{sg}$, rotor voltage $V_r$, and rotor current $I_r$ can be observed. The data in FIG. 7 was derived for a motor including a shield according to the first embodiment of the present invention. The shield was constructed by inserting one inch adhesive backed copper foil tape strips to cover the stator slot areas. The shield was connected to the stator frame 12 and the frame 12 was grounded.

Comparing the wave forms of FIGS. 5 and 7, as expected, the stator neutral to ground voltage $V_{sg}$ remains substantially the same with the shield in place. However, both the rotor voltage $V_r$ and rotor current $I_r$ in FIG. 7 remain approximately zero during motor operation. While some stray electric field may reach the rotor thus causing a small charge buildup and rotor voltage potential $V_r$, metal-to-metal ball-ring contact takes place prior to the potential $V_r$ reaching the breakdown voltage $V_{ab}$ (see FIG. 6), thus discharging the built up charge. The rotor potential $V_r$ never reaches the breakdown potential $V_{ab}$ when the shield is in place. This means that virtually no current is discharging through the ball bearings.

Experimental data has shown that with the shield in place, rotor voltage $V_r$ is reduced in precise proportion to rotor exposure to the stator windings. For example, with the stator windings half covered by the shield, the rotor voltage $V_r$ was reduced by 50%. When the shield was extended to enclose all of the windings including the stator-end stator windings, a complete shielding of the rotor voltage $V_r$ was observed. In this manner, the rotor voltage $V_r$ and current $I_r$ are substantially reduced and thus, EDM is if not entirely is substantially limited.

Referring now to FIG. 9, in a second embodiment of the present invention, rather than rely upon the conductivity of the frame 12 to dissipate the induced charge therein through contact with a shielding member, a conductive layer 40 of material is attached to the entire internal surface 18 of the stator 10, including all surfaces of the slots 20.

This layer 40 can be attached to the internal surface 18 in any manner known in the art. Preferably, the layer is sprayed on, or electroplated to, the surface 18 prior to installing the stator windings 22 within the slots 20. After the conductive layer 40 has been attached, the stator winding 22 is positioned within the slot 20. In this embodiment, after positioning the stator winding within the slot, a conductive cap 42, preferably constructed of the same or similar material as the layer 40, is positioned within each slot 20 so as to make contact with internal surface 18 but avoid contact with the adjacent stator winding 22.

Referring now to FIG. 10, in a third embodiment of the present invention cylindrical shields 46 are formed around each of the stator winding 22. Each shield 46 extends the length of an associated stator winding 22 and each shield is separately grounded. In this embodiment the frame 12 is also grounded so that any static charge due to sources other than the stator 20 windings 22 is also dissipated.

Referring to FIGS. 9 and 10, in both the second and the third embodiments, while capacitance exists between each stator winding 22 and its surrounding conducting surfaces, because all the surrounding conducting surfaces are connected and grounded, any charge induced on any of the conducting surfaces is dissipated rapidly.

While the disclosure above describes various embodiments of an apparatus contemplated by the present invention, the present invention should not be so limited, and contemplates a method of providing a motor wherein electrostatic discharge machining is substantially reduced. The method comprises the steps of providing an electrically conductive shielder between the stator and the rotor, the shielder electrically separated from both the stator windings and the rotor when so positionable and connecting the shielder to ground. Preferably, this step of providing the shielder includes the steps of forming the shielder so that it will completely separate the stator from the rotor and securing the shielder between the stator and the rotor.

Also, preferably, the stator includes a frame encircling both the rotor and the stator windings, the frame supported by, and electrically isolated from the stator windings. The step of securing a shielder may include the step of connecting the shielder to the frame. This step of providing the shielder may include the step of forming a film of electrically conductive material on an internal surface of the frame, the internal surface facing the rotor and the stator windings, and forming a plurality of electrically conducting covers, one cover corresponding to each winding, each winding surrounded by a cover and an adjacent portion of the film.

It should also be noted that the methods and apparatuses described above are only exemplary and do not limit the scope of the invention, and that various modifications can be made by those skilled in the art that may fall under the scope of the invention.

For example, referring to FIG. 8, if desirable, the shield members 36 could be replaced by a single cylindrical shield positioned between the stator 11 and the rotor 10, the shield being connected to neither the stator nor the rotor. The important aspect of the present invention being that capacitive coupling between the stator and the rotor is substantially eliminated in some manner, thus reducing the rotor voltage $V_r$. In addition, while the present invention has been described as being used with an AC motor, the invention could be used with any type of electromagnetic machine wherein a stator and rotor operate together. Thus, it is contemplated that the present invention could be used with DC motors and/or generators.

In order to apprise the public of the various embodiments that may fall within the scope of the invention, the following claims are made:

We claim:

1. An apparatus for reducing capacitive coupling between a stator and a rotor of an electromagnetic machine, the stator including a plurality of stator windings, the apparatus comprising:

an electrically conductive shielder positionable between the stator and the rotor, the shielder electrically separated from both the stator windings and the rotor when so positioned; and a grounder electrically connected to the shielder and connectable to ground.

2. The apparatus recited in claim 1 wherein the shielder completely separates the stator from the rotor when positioned therebetween.

3. The apparatus as recited in claim 2 wherein the stator includes an annular frame around both the rotor and the stator windings, the frame supporting, and electrically isolated from, the stator windings, the shielder connectable to, and supportable by, the frame.

4. The apparatus as recited in claim 3 wherein the shielder further includes a film of electrically conducting material on a portion of the frame facing the stator windings and the rotor, the shielder contacting the film.

5. The apparatus as recited in claim 1 wherein the shielder further includes electrically conductive conduits, each conduit completely surrounding a portion of each stator winding, and each conduit being grounded.

6. The apparatus as recited in claim 1 wherein the shielder is formed of copper.

7. A method for reducing capacitive coupling between a stator and a rotor of an electromagnetic machine, the method comprising the steps of:

providing an electrically conductive shielder between the stator and the rotor, the shielder electrically separated from both the stator windings and the rotor when so provided; and connecting the shielder to ground.

8. The method as recited in claim 7 wherein the step of providing the shielder includes the steps of providing the shielder so that it will completely separate the stator from the rotor and securing the shielder between the stator and the rotor.

9. The method as recited in claim 8 wherein the stator includes a frame encircling both the rotor and the stator windings, the frame supported by, and electrically isolated from, the stator windings, and, wherein, the step of securing the shielder includes the step of securing the shielder to the frame.

10. The method as recited in claim 7 wherein, the step of providing the shielder includes the steps of providing a film of electrically conducting material on an internal surface of the frame, the internal surface facing the rotor and stator windings, and providing a plurality of electrically conducting covers, one cover corresponding to each winding, each winding surrounded by a cover and an adjacent portion of the film.

11. The method as recited in claim 7 wherein the step of providing the shielder includes the step of providing the shielder so that each stator winding is surrounded by the shielder.

12. An apparatus for reducing capacitive coupling between a stator and a rotor of an electromagnetic machine, the stator including a plurality of stator windings, the apparatus comprising:

an electrically conductive shielder connectable to the stator, when so connected the shielder completely separating the stator and the rotor and completely encircling each stator winding, the shielder electrically disconnected from both the stator windings and the rotor; and a grounder connecting the shielder to ground.

13. The apparatus as recited in claim 12 wherein the stator includes an annular frame around both the rotor and the stator windings, the frame supporting, and electrically isolated from, the stator windings, the shielder connectable to, and supportable by, the frame.

14. The apparatus as recited in claim 13 wherein the shielder includes a film of electrically conducting material between the frame and the stator windings and the frame and the rotor.

15. The apparatus as recited in claim 12 wherein the shielder is formed of copper.

* * * * *